Feb. 17, 1959 R. W. HUTTON 2,874,223

MIXED-RINGING PARTY-LINE TELEPHONE SYSTEM

Filed Aug. 27, 1953 4 Sheets-Sheet 1

Feb. 17, 1959 R. W. HUTTON 2,874,223

MIXED-RINGING PARTY-LINE TELEPHONE SYSTEM

Filed Aug. 27, 1953 4 Sheets-Sheet 2

Feb. 17, 1959 R. W. HUTTON 2,874,223

MIXED-RINGING PARTY-LINE TELEPHONE SYSTEM

Filed Aug. 27, 1953 4 Sheets-Sheet 3

Feb. 17, 1959 R. W. HUTTON 2,874,223

MIXED-RINGING PARTY-LINE TELEPHONE SYSTEM

Filed Aug. 27, 1953 4 Sheets-Sheet 4

2,874,223

MIXED-RINGING PARTY-LINE TELEPHONE SYSTEM

Robert W. Hutton, Chicago, Ill., assignor to International Telephone and Telegraph Corporation, a corporation of Maryland Application August 27, 1953, Serial No. 376,785

5 Claims. (Cl. 179—17)

This invention relates to a mixed-ringing party-line telephone system. Its principal object is to provide a new and improved circuit and operational arrangement which permits a group of trunk-associated circuits, or couplers, to be used economically and satisfactorily to ring called party-line stations on a group of lines which comprises two types of lines from the party-line ringing standpoint.

I. GENERAL DESCRIPTION

In a party-line telephone system, the lines are of one ringing type or another depending upon the arrangement employed to ring called stations thereon. The usual ringing types of party lines are code-ringing, biased-ringing, and harmonic-ringing lines. The lines of any such ringing type may or may not involve divided ringing, wherein stations, or station groups, have their ringers connected between ground and respective ones of the two line conductors. Each of the noted ringing types of party lines requires a character of ringing current not required by either of the other two. For example, code-ringing lines require merely a single frequency of ringing current which is applied in code to indicate the called station; biased-ringing lines, while requiring only a single frequency, require that the ringing current be polarized according to the station desired, as by being superimposed on a direct-current source of the required polarity; and harmonic-ringing lines require ringing current of frequencies assigned to respective stations. Special problems thus arise when two or more ringing types of party lines are served by the same installation.

In larger installations, the lines comprise a number of switching groups, and separate ringing facilities thus may be employed at the several groups, thereby enabling party lines of two or more ringing types to be handled readily as separate switching groups. In smaller installations, however, only a single switching group may be warranted, and it has been customary to restrict the party lines to a single ringing type, thus requiring that local (or urban) party lines be of the same ringing type as the longer and more heavily loaded rural lines. It is, therefore, a specific object of this invention to provide economical and practical arrangements permitting local party lines and rural party lines of the same switching group to be accommodated as lines of different ringing types.

It has been chosen to illustrate the invention as applied to a primary-secondary-spread crossbar telephone system, of the general type disclosed in the U. S. patent application of Bellamy et al., Serial No. 85,292, filed April 4, 1949, now Patent No. 2,674,657, wherein harmonic ringing is employed generally for the party lines contained in a group of one thousand lines, and wherein it is desired that code ringing be employed for any selected line or selected group of the lines, and wherein the improved block translator of the U. S. patent application of R. P. Boyer for an automatic telephone system and translator therefor, Serial No. 217,791, filed March 27, 1951, now Patent No. 2,710,893, is used therein.

Two embodiments of the invention are disclosed. In the preferred embodiment, a block coupler in use responds to control from the block translator to switch over from harmonic ringing to code ringing when a predetermined line, or group of lines, is called. In the second embodiment a block coupler in use is conditioned for one type of ringing or the other by the dialing of one initial digit, or another.

An important feature of the block translator as used in the preferred embodiment is that a common group of detector relays is provided, any one of which can be adapted to provide alternate ringing (code ringing) for various-sized line groups.

Other objects and features of the invention will become apparent as the description progresses.

IA. *The drawings*

In the drawings, comprising Figs. 1 to 4;

IB. *Call-through operation (Fig. 1)*

Figure 1:
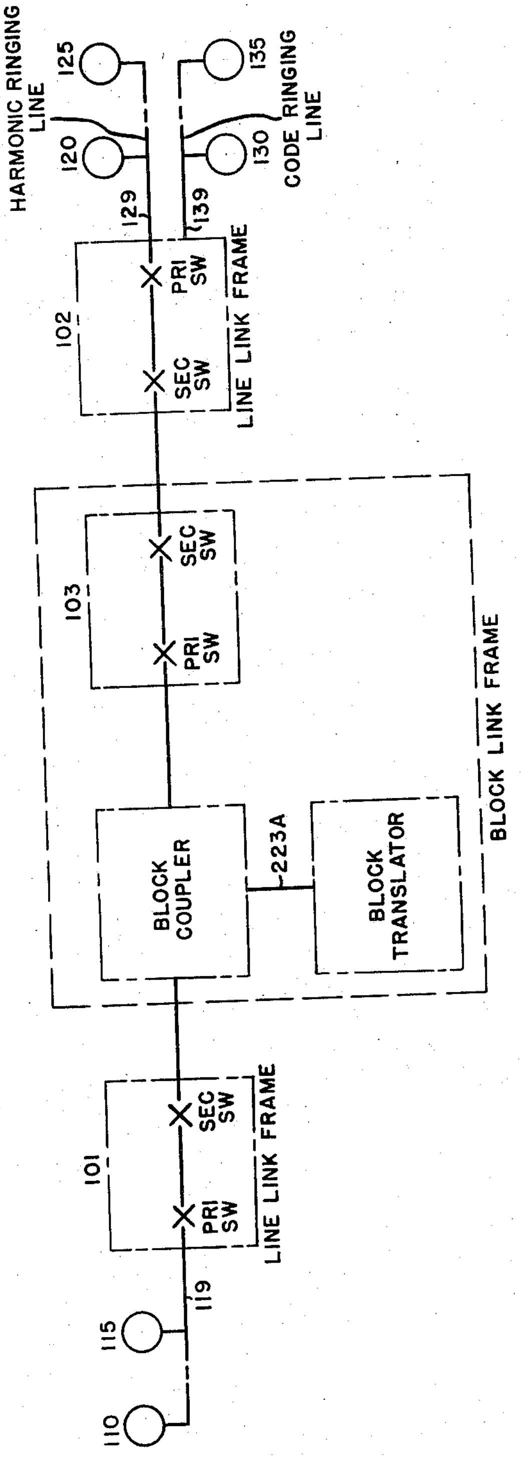
Fig. 1 is a single-line simplified call-through diagram.

Referring now to Fig. 1 of the drawings, a simplified single-line call-through diagram is shown in order to more clearly set forth the relationship existing between the block coupler and block translator shown herein and the party lines of the noted primary-secondary-spread crossbar telephone system.

Any calling station 110 to 115 on a party line such as line 119 is extended to the block coupler shown herein by operation of the line-link primary and line-link secondary switches and apparatus 101 and is further extended through the block coupler to a called station 120 to 125 or 130 to 135 on harmonic-ringing line 129 or code-ringing line 139, respectively, by operation of the block-link primary and block-link secondary switches and apparatus 103 and the line-link primary and line-link secondary switches and apparatus 102.

Line-link switches and apparatus 101 and 102 and the block-link switches and appartus 103 correspond respectively to the line-link frames and block link frame of the noted Bellamy et al. application.

The block translator of the Boyer application is associated with the block couplers over conductors in cable 223A. The operation of the block translator in controlling the type of ringing supplied by the block coupler will be described in detail hereinafter.

IC. *General operation (Figs. 2 and 3)*

The operations involved in supplying the proper type of ringing current to lines of a system having mixed ringing will now be described in general with particular reference to Figs. 2 and 3.

Figure 2:
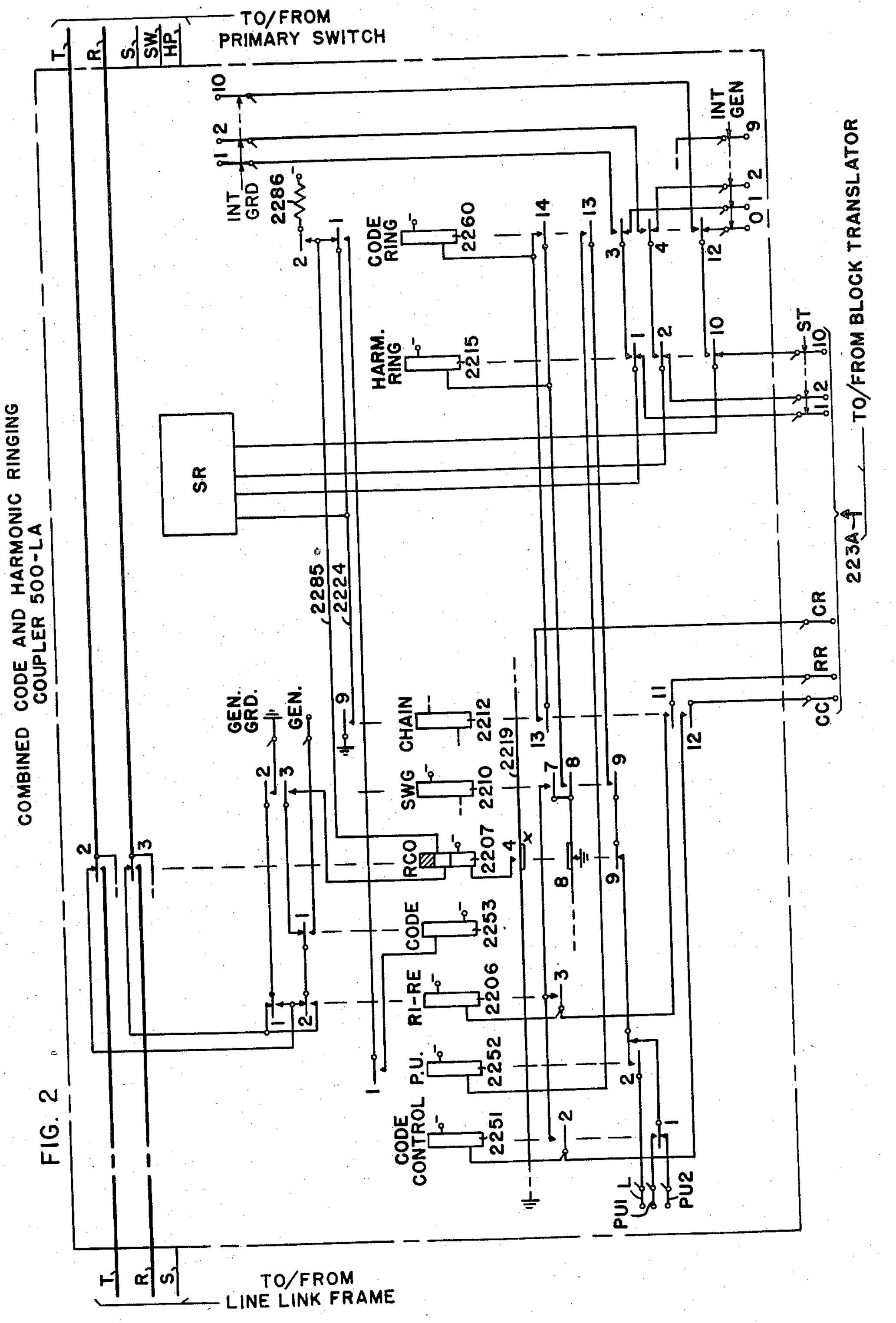
Figs. 2 and 3 are circuit diagrams, respectively, of a block coupler and the block translator of Fig. 1 illustrating the preferred embodiment of the invention.

In Fig. 2 of the drawings, combined code and harmonic ringing coupler 500–LA is arranged for substitution in place of block coupler 500–L of Fig. 5 of the noted Ballamy and Bowser application. Coupler 500–LA, however, provides both ten-station and twenty-station code-ringing service as provided by block coupler 2200 and provides the ten-station harmonic-ringing service as provided by block coupler 500–L.

In block coupler 500–LA, the parts similar to those of the code-ringing block coupler 2200 of the noted Bellamy et al. application are given similar reference characters whenever such assignment is possible. Of the impulse counting devices SE to SR of the noted code ringing clock coupler 2200, only stations register SR is shown. Relay 2260 is an added relay which has no counterpart in coupler 2200, but relays 2201 to 2215 are similar respectively to the relays of the corresponding code-ringing coupler except for contacts added to certain relays to control the circuits of the added relay.

Added relay 2260 is a code relay which is operated to supply code-ringing current in accordance with the code assigned to the called station in lieu of the normal harmonic ringing current which would normally be placed on the called line. Common wires CC, RR, and ST-1 to ST-10 are common wires similar to those employed in code-ringing coupler 2200. Code ring wire CR and wires INT-GRD 1 to INT-GRD 10 are newly added wires.

The seizure of the block coupler 500-LA, the receipt of the digit pulses of the directory number, the calling-in of the block controller, the chain seizure and guarding, the digit setting of the block translator and the testing and seizure of the called line is as described in the noted Bellamy et al. application.

II. DETAILED DESCRIPTION

A detail description of the first embodiment of the invention will now be given.

IIA. *Harmonic ringing coupler operation*

Block coupler 500-LA and its associated common ringing apparatus provide for accommodating ten harmonic ringing stations, either bridged or divided ringing, on any party line by (1) employing a one-ring code and a two-ring code for each of five frequencies of ringing current, and by (2) ringing over one line wire or the other according to the station called, as shown in the harmonic-ringing chart of the noted Bellamy et al. application.

As noted in the above application, in order to provide the above-mentioned party-line ringing service, the ten interrupted generator leads INT-GEN 0 to 9 are controlled by the usual common ringing apparatus, in that the station generator leads numbers 0, 1, 2, 3, and 4 have respective frequencies 1 to 5 applied thereto once each ringing cycle and in that generator leads numbers 5 to 9 have respective frequencies 1 to 5 applied thereto twice during each ringing cycle.

As will be described hereinafter, if the desired station called is one on a code-ringing line, ground potential will appear on the code-ringing wire CR extending between coupler 500-LA and the modified block translator shown in Fig. 3. However, assuming that the called station is one on a harmonic-ringing line, no ground is forthcoming over the CR wire and the coupler functions as a harmonic-ringing coupler.

Responsive to the operation of terminating chain relay 2212, contacts 9 ground conductor 2224. Ground is thereby extended through the selected contacts of station register SE and thence to the corresponding contacts of harmonic ringing relay 2215 (transfer relay of the block coupler of the noted Bellamy and Bowser application) to the selected one of the stations wires ST-1 to ST-10 extending to the modified block translator over conductors in cable 223A.

As described in the noted Bellamy et al. application, if stations digits 0 to 4 have been dialed, no ground appears on the ring-reverse wire RR. However, if the digit information received over the stations wires show that any station digit 5 to 9 has been dialed, ground appears on the ring-reverse wire RR and is extended through make contacts 11 of chain relay 2212 to the battery-connected winding of ring-reverse relay 2206, which operates. When it is thus operated, ring-reverse relay 2206 reverses the ringing leads at its contacts 1 and 2 and at its contacts 3 prepares to lock itself to ground through contacts on the switching and ring-cutoff relays, relays 2210 and 2207.

As described in the noted Boyer application, the block translator upon receiving the extended digit information transmits a suitably translated version of the digits to the line controller of the frame terminating the called line, whereupon the line controller and the block controller determine the busy or idle condition of such line.

If the called line is busy, the busy relay (not shown) is operated and busy tone is returned to the calling line as described in the Bellamy at al. application.

If the called line is idle, and an idle path can be matched thereto, the block controller (not shown) and switch wire SW of the block coupler mechanically closes a connection to the called line. Upon the connection being extended to the called line, contacts on the primary switches 103 associated with the block coupler returns ground over the hold pilot wire HP which thereupon operates switching relay 2210 as described in the Bellamy et al. application.

Upon operating, switching relay 2210 restores the chain relay and frees the terminating chain and the common control apparatus; contacts 7 complete the locking circuit of ring-reverse relay 2206 if it is operated; contacts 8 extend ground to the battery-connected winding of harmonic-ringing relay 2215; contacts 2 and 3 close the ringing circuit to the called line; and the remaining contacts not shown perform their respective functions.

Upon operating, harmonic-ringing relay 2215 transfers the output leads of the stations register SR from the stations leads ST extending to the block translator to the ten interrupter generator leads INT-GEN 0 to INT-GEN 9.

The ringing circuit for the called station on a harmonic-ringing line is from the selected one of the interrupter generator leads INT-GEN 0 to INT-GEN 9, the associated break contacts of code-ring relay 2260, make contacts of harmonic-ringing relay 2215, the selected contacts of stations register SR, conductor 2285 through contacts 1 of code ring relay 2260, the winding of ring-cutoff relay 2207, make contacts 3 of switching relay 2210, and break contacts 1 of relay 2253 from whence it passes to the tip conductor T of the called line (if stations digit 0 to 4 has been dialed and ring-reverse relay 2206 is not operated) through break contacts 2 of relays 2206 and 2207 or to the ring conductor R of the called line (if the stations digit 5 to 9 has been dialed and ring-reverse relay 2206 is consequently operated through make contacts 2 of ring-reverse relay 2206 and break contacts 3 of ring-cutoff relay 2207.

A return path to ground for the transmitted ringing current is provided (1) over the ring conductor R (when ring-reverse relay 2206 is not operated) through break contacts 3 and 1 of relays 2207 and 2206, and make contacts 2 of switching relay 2210 to generator-ground conductor GEN-GRD, or (2) over the tip conductor T (when ring-reverse relay 2206 is operated) through break contacts 2 of relay 2207 and through make contacts 1 of ring-reverse relay 2206 to conductor GEN-GRD.

Ring-cutoff relay 2207, whose line winding is included in the ringing circuit does not operate before the call is answered for each ringer on the called line (not shown) has the usual condenser in series therewith to block direct-current flow and because the shading collar surrounding the armature end of the core of relay 2207 keeps it from responding to the alternating ringing current.

As pointed out in the noted Bellamy et al. application, ring-cutoff relay 2207 may be operated by direct-current flow during the application of ringing current as the ringing current is in series with the exchange battery, and during the silent period as battery alone is supplied to each of the generator leads rather than generator current in series with the exchange battery.

When the call is answered at the called station, the closure of the usual talking bridge across the called line causes current to flow thereover from the generator lead in use, operating ring-cutoff relay 2207 through its line winding sufficiently to close its preliminary-make contacts 4. These contacts close a local self-locking circuit and operate relay 2207 fully. At its contacts 2 and 3, relay 2207 opens the ringing circuit and completes the talking circuit, and restores relay 2206 and relay 2215 as pointed out in the noted Bellamy et al. application.

The answer supervision, the completion of the talking circuit and the consequent clearout after conversation is as described in the noted Bellamy et al. application.

Block coupler 500–LA permits reverting calls to be made as none of the added relays affect reverting call operation.

IIB. *Code-ringing coupler operation*

When the called station is one on a code-ringing line, coupler 500–LA responds to control from the modified translator of the Boyer application to condition the block coupler to change over from a harmonic-ringing coupler to a code-ringing coupler. This operation is as follows:

The combined code and harmonic ringing block coupler 500–LA in addition to providing the hereinbefore described harominc-ringing service, provides ten-station and twenty-station code-ringing service. Relay 2251 is a code-control relay operable over wire CC from the associated translator to cause the pickup relay 2252 to be operated in an earlier portion of the code-ringing cycle to thereby cause a preliminary ring to be transmitted when the station being called is one of the second stations on a twenty-station line, code relay 2253 is operated to apply ringing current in accordance with the code assigned to the called station, and code-ring relay 2260 operates when the called station is on a code-ringing line to transfer the station wires from the interrupted generator leads to the interrupted ground leads for code ringing.

Common wires L, PU–1, PU–2, CC, and RR are common wires employed for block coupler 500–LA in addition to the other wires not shown but set forth in the noted Bellamy et al. application.

IIB1. *Ten-station code-ringing operation*

When block coupler 500–LA is employed to call a code-ringing line having not more than ten stations thereon, the common code control conductor CC incoming from the associated block translator is not grounded, wherefore code control relay 2251 remains operated.

Responsive to the operation of chain relay and the consequent grounding of conductor 2224, ground appearing on the selected one of the stations wires ST–1 to ST–10 is extended to block translator 1800 over corresponding conductors in cable 223A and the translator responds as hereinbefore noted to direct the call to the called line and to transmit the proper identifying signal notifying the block coupler whether the station called is one on a ten-station line or one on a twenty-station line. Also, translator 1800 transmits information over the code ring wire CR notifying the block coupler whether the called station is on a code-ringing line or not.

Responsive to the grounding of the code wire CR when the called station is on a code-ringing line, ground is extended through make contacts 13 of chain relay 2212 to the battery-connected winding of code-ring relay 2260. Code-ring relay 2260 operates and prepares to lock operated through its make contacts 14.

Responsive to the common control apparatus testing the called line and finding it idle, it extends the calling connection as hereinbefore noted. Upon the consequent return of ground on hold-pilot wire HP, switching relay 2210 is operated and chain relay 2212 is restored. Contacts 8 of the switching relay 2210 lock relay 2260 operated and apply ground potential to the battery-connected winding of harmonic ringing relay 2215, causing it to operate. Contacts 1 and 2 of relay 2260 disconnect wire 2285 from wire 2224 and connect it to battery potential through resistor 2286.

At the time the ringing operation is ready to commence, block coupler 500–LA has been seized over its incoming conductors T, R, and S and operations have occurred as hereinbefore described for coupler 500–LA to cause the outgoing conductors T, R, and S to be extended through a primary switch to the called line. At that time, switching relay 2210 and code-ring relay 2260 are operated. Responsive to such operation of switching relay 2210, harmonic-ring relay 2215 operates and locks. Contacts 2 and 3 of switching relay 2210 extend generator ground GEN–GRD to contacts 1 of ring-reverse relay 2206 and extend the battery-connected trip winding of relay 2207 (from the battery through current-limiting resistor 2286) through break contacts 1 of code relay 2253 to contacts 2 of ring-reverse relay 2206. From contacts 1 and 2 of relay 2206, these noted conductors are extended through break contacts 2 and 3 of ring-cutoff relay 2207 to conductors T and R in the outgoing group and consequently to the called line.

Contacts on relay 2215 and 2260 transfer the output wires of the stations register SR from the stations leads ST–1 to ST–0 to the common code wires Code–0 to Code–9.

Wires Code–0 to Code–9 are controlled by the code ringing apparatus (not shown) which controls the wires PU–1 and PU–2 which are associated with relays 2251 and 2252. Wire 2224 is connected to one or another of the wires Code–0 to Code–9 through make contacts of harmonic-ring relay 2215 and code-ring relay 2260 depending upon the setting which is imparted to the stations register SR.

With code control relay 2251 restored as assumed, (the called line is a ten-party line) the second pickup wire PU–2 is connected through contacts 1 of relay 2251, break contacts 2 of pickup relay 2252, break contacts 9 of relay 2207, make contacts 9 of switching relay 2210 and make contacts 13 of relay 2260, to the battery-connected winding of pickup relay 2252. Consequently, when PU–2 is next grounded, just prior to the beginning of the normal code-sending operation of the common apparatus, pickup relay 2252 is operated thereover. Contacts 2 thereof lock the relay to locking wire L and disconnect pickup wire PU–2. Contacts 1 of pickup relay 2252 connect common wire 2224 of register SR to code relay 2252. As a result, each time a code signal is placed on one of the wires Code–0 to Code–9, code relay 2253 operates for the duration of the signal. At its contacts 1, relay 2253 disconnects the trip winding of relay 2207 and substitutes the common generator wire GEN over which the common source of ringing current is supplied. Ringing current is thereby transmitted to the called line for the duration of operation of code relay 2253. One or more consequent operations of code relay 2253 during the current cycle of the common ringing machine transmits ringing current over the called line in accordance with the code assigned to the called station thereon. This code signal is repeated as many times as desired, but each time the common ringing equipment reaches the silent interval, it opens wire L, unlocking and restoring any operated pickup relay 2252, which subsequently reoperates if the call has not been answered when pickup position is again reached.

Ring-reverse relay 2206 operates as described to cause ringing current to be sent over the ring conductor R (rather than the tip conductor T) for the last five stations, 5 to 9, on a ten-station line permitting divided ringing to be used, if desired.

When the call is answered, or soon thereafter, code relay 2252 restores if it is then operated, the upper winding of cutoff relay 2207 is energized over the called line, through contacts 2 and 3 of relay 2207 and contacts 1 and 2 of relay 2206 to ground through contacts 1 of code relay 2253 and make contacts 2 of relay 2210. At its contacts 4 relay 2207 thereupon locks its own winding to ground on conductor 2219 with results, as hereinbefore described, which include the opening of the ringing circuit and the closing of the talking circuit. Additionally, contacts 9 of relay 2207 restore pickup relay 2252 (if then operated) thereby disconnecting code relay 2253.

The remaining operation of block coupler 500–LA in clearing out is as hereinbefore described in the noted Bellamy et al. application with relay 2260 restoring when relay 2210 restores.

IIB2. *Twenty-station code ringing operation*

When a twenty-station line is called, the described normal code-ringing operation of block coupler 500–LA occurs if a called station is one of the first ten stations on the called line, that is one of the stations indexed by the suffix of the directory number normally assigned to the concerned line, as described in connection with the operation of the block translator of the noted Boyer application.

When the called station is on a twenty-station line, the block translator operates as described in the Boyer application to apply ground potential to the common code control conductor CC. This operation occurs while the terminating chain relay 2212 is in an operated condition, thereby closing a circuit through contacts 12 thereof for code control relay 2251. Relay 2251 thereupon operates and at its contacts 2 prepares a locking circuit which is closed in due course at contacts 7 of switching relay 2210 to ground through contacts 8 of ring cutoff relay 2207. At its contacts 1, code control relay 2251 disconnects the second pickup wire PU–2 and substitutes the first pickup wire PU–1.

When switching relay 2210 operates, as hereinbefore described, contacts 9 thereof connect pickup relay 2252 through contacts 13 of relay 2260, contacts 9 of relay 2207, normally closed contacts 2 of relay 2252, and make contacts 1 of operated relay 2251 to pickup wire PU–1. Relay 2252 therefore operates to start the code-ringing operation as soon as wire PU–1 is next grounded.

The previously-mentioned common ringing equipment is of the well known type which first momentarily grounds pickup wire PU–1 and later grounds pickup wire PU–2. In the interval between the two pickup pulses, the common ringing equipment transmits the preliminary code signal over wires Code–0 to Code–9. Having been operated over wire PU–1, pickup relay 2252 is now in an operated condition when the preliminary ringing signal is transmitted by the common ringing equipment. As a result, code relay 2252 receives the distinguishing preliminary signal over one of the code wires selected by the stations register SR, and transmits a corresponding preliminary ringing signal, followed by the station code indicated by the current setting of stations register SR. The transmission of the preliminary ringing signal identifies the called station as being one in the second group of ten on the called line rather than one in the first group of ten thereon.

The remainder of the operation of block coupler 500–LA is as described hereinbefore.

IIC. *Translator code-ringing control*

As hereinbefore pointed out, responsive to the calling of a station on a code-ringing line, block translator 1800 grounds the common code-ring wire CR to condition the block coupler to change over from harmonic ringing to code ringing. The operations involved by the block translator in controlling such wire will now be described.

Figure 3:
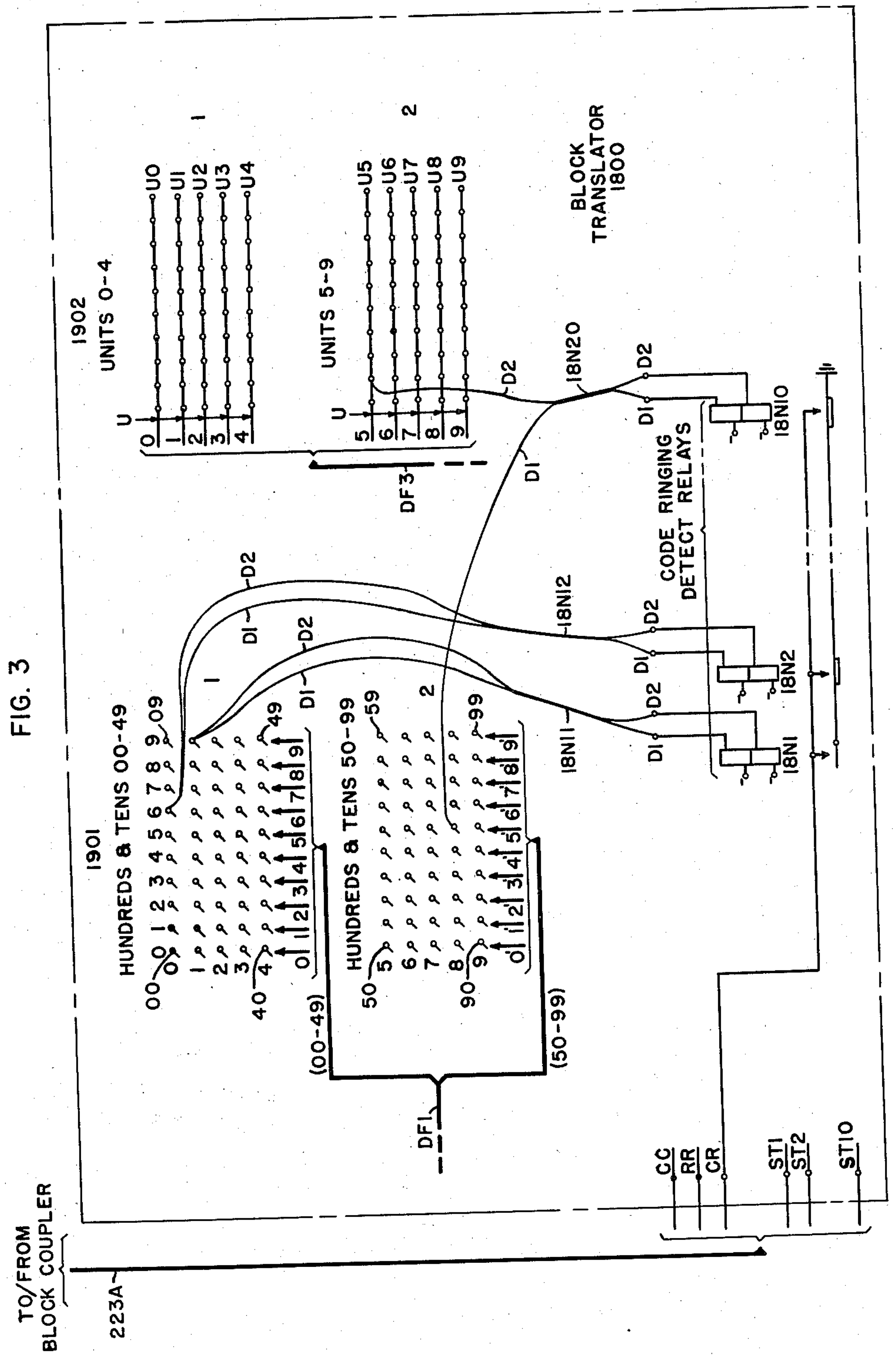

Block translator 1800 of the noted Boyer application is shown in Fig. 3 as a dotted rectangle showing only ten code-ringing detect relays 18N1 through 18N10 and a portion of the pin terminal section of the detector field used in conjunction therewith.

Of the ten sections of the pin-terminal section of the noted Boyer application, only the first and the second sections 1901 and 1902 are shown fragmentarily. The first and second four five-level groups of each of these two sections are the only ones shown, the remainder being assumed as disclosed in the Boyer application.

The one hundred terminals in groups 1 and 2 of section 1901 correspond respectively to registered hundreds digits 0 to 9 and tens digits 0 to 9 and terminate 100 wires, 00 to 99.

The 100 terminals in the first ten levels, comprising groups 1 and 2 of section 1902 are assigned respectively to registered units digits 0 to 9 and terminate units wires U0 to U9.

IIC1. *General operation for code-ringing line detection*

As contrasted to common-number service, line-intercept service, and line-number-transfer service described in the noted Boyer application, code-ringing line-detection service does not affect the normal fixed translation as does the above noted services.

The detecting operation is performed by individual code-ringing detect relays separately assignable to desired numbers to be detected. The ten detector relays 18N1 to 18N10 are so adjusted to operate only if both windings are energized. For each detector relay, these windings are wired to separate detector terminals D1 and D2 from whence they may be jumpered as desired throughout the detector field.

To prepare a detector relay to detect a specific called station or called number, a two-conductor jumper is run from its terminal pins D1 and D2 to carry the winding terminals of the detector relay to the two terminal pins of the detector field section 1901 or 1902. If one such terminal pin is a hundreds and tens pin in groups 1 and 2 of section 1901 and the other a units pin in groups 1 or 2 of section 1902, ground will appear on both such terminal pins only when the specific number is called. The concerned detector relay then operates as both of its windings are energized, each over a separate wire of the noted detector jumper.

Jumper 18N20 is one example of the noted two-wire detector jumper connected between the hundreds and tens detect field and the units detect field.

IIC1*a*. *Ten-line group detection*

Assuming that the last ten lines in the second group of 100 lines are code-ringing lines, the operation of the block translator in transmitting identifying information to the block coupler 500–LA to condition it to code-ring such lines as follows:

Assuming that the hundreds digit dialed is a 1 and the units digit is a 9, as pointed out in the noted Boyer application, ground potential from the hundreds and tens register relays of block translator 1800 appear on terminal 19 in the detector field of section 1901 over the corresponding conductor in cable group DF–1. Ground appearing on such terminal is extended over the jumpers D1 and D2 of two conductor jumper 18N11 to the corresponding terminals D1 and D2 on the first code-ringing detect relay 18N1.

Relay 18N1 operates and at its contacts extend ground potential over code-ringing wire CR to block coupler 500–LA over conductor CR in cable 223A to cause the code-ring relay 2260 thereof to operate as previously described and to cause the called station on the code-ringing line to be code rung.

As previously pointed out, the code-ring relay of the coupler operates and is followed shortly thereafter by the restoration of the chain relay which frees the common equipment and removes ground from the detector field. The removal of ground from the detector field restores detector relay 18N1, removing the ground from the code wire CR thereby returning the block translator to common use.

Code ringing detector relay 18N2 is shown connected to the hundreds and tens wire 06 of the hundreds and tens detector field, whereby responsive to the dialing of the hundreds digit 0 and a tens digit 6, the code-ring wire CR is grounded thereby causing all ten lines in that group to be code ringing lines.

IIC1*b*. Individual-line detection

If it is desired to have an individual code ringing line in place of the described ten-line group of code ringing lines, detector jumper 18N20 is connected as illustrated to detector relay 18N10.

As shown in Fig. 3 of the drawings, the two-wire jumper 18N20 has its detector terminal D1 connected to the hundreds and tens terminal pin 85 and has its detector wire D2 connected to the units bus bar U5. Therefore responsive to the dialing of the hundreds digit 8, the tens digit 5, and the units digit 5, both windings of the detect relay 18N10 are energized and relay 18N10 operates and grounds the code-ring wire CR in the manner previously described.

Under such arrangement, any individual line or any group of ten lines in a group of one thousand lines may be code-ringing lines by the assignment of a code-ringing detect relay to such directory numbers.

III. SECOND EMBODIMENT (Fig. 4)

Figure 4:
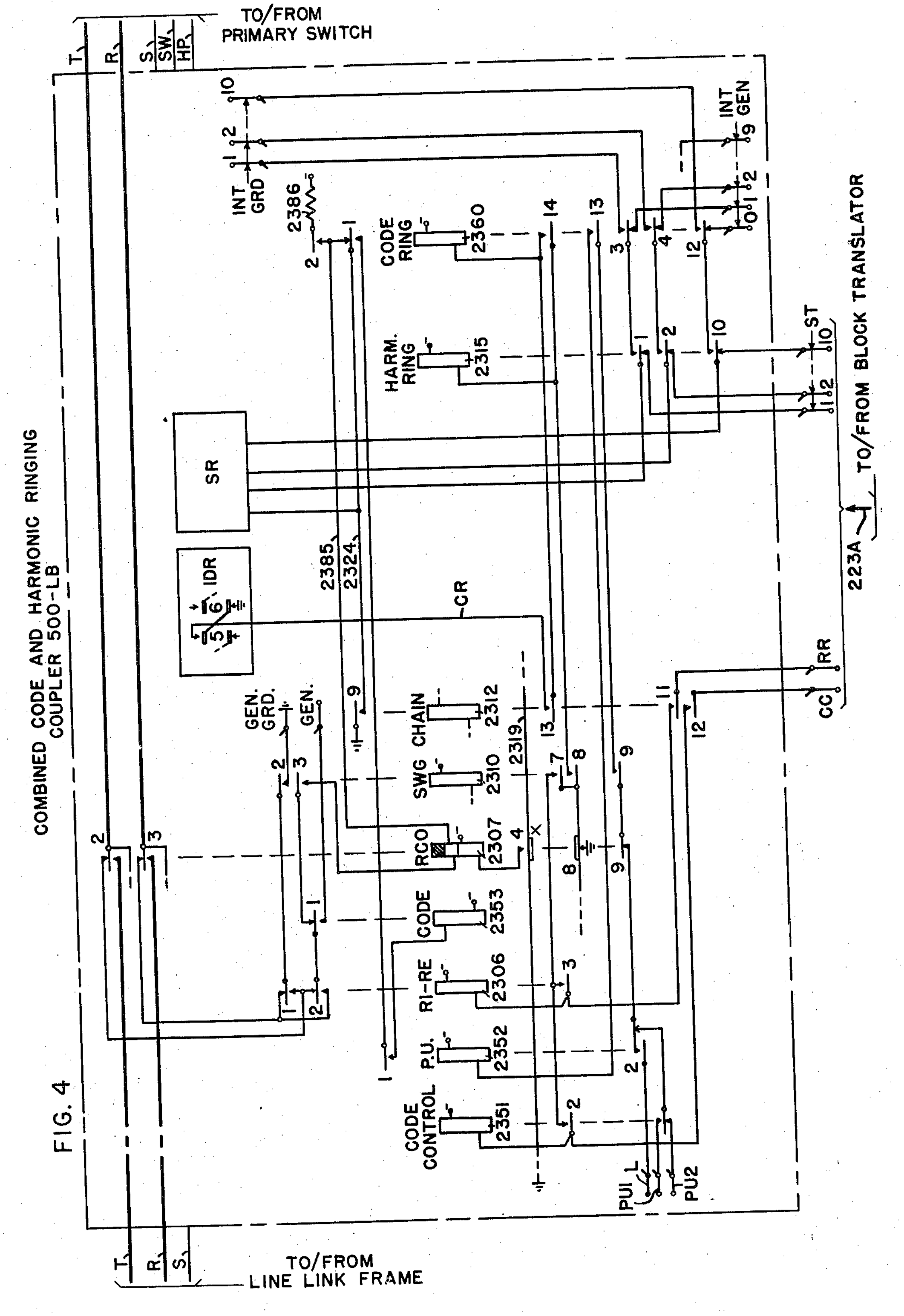
Fig. 4 is a circuit diagram of a block coupler modified to illustrate the second embodiment of the invention.

Referring now to Fig. 4 of the drawings, a description of the second embodiment of the invention will now be given. In this embodiment, the coupler is conditioned to code-ring certain lines without the aid of the specially modified block translator.

In block coupler 500–LB, the parts similar to those of the block coupler of Fig. 2 are given similar reference characters but in the 2300 series rather than the 2200 series. The impulse counting devices SE to SR of block coupler 500–L of the noted Bellamy et al. application are similar to those of Fig. 4 of the drawings with the exception of the initial digit register IDR.

As noted in connection with Fig. 2, code-ring relay 2360 when operated, conditions the coupler for code ringing. Relay 2360 is an added relay which has no counterpart in Fig. 5 of the noted Bellamy et al. application but corresponds to the code-ringing relay 2260 of Fig. 2. Relays 2351 to 2360 and common wires CC, RR, and ST–1 to ST–10 are similar respectively to the relays and wires of the corresponding code ringing coupler of Fig. 2. However, code-ring wire CR is omitted as the change-over from harmonic ringing to code ringing is accomplished internally without the aid of the translator.

The seizure of block coupler 500–LB, the receipt of the digit pulses of the directory number, the calling-in of the block controller, the chain seizure and guarding, the digit setting of the block translator, and the testing and seizure of a called line is as described with reference to Fig. 2. However, the discrimination between code and harmonic ringing is determined by the dialing of one or another of two initial digits assigned to the local lines of the exchange.

IIIA. *Harmonic-ringing operation*

When the block coupler 500–LB is employed to call a harmonic-ringing line, the dialing of the initial digit 6 to index the call as a local call, as described in noted Bellamy et al. application, is followed by the dialing of the remaining digits of the directory number. Under such assumed condition, the initial digit register IDR operates its make contacts 6 to mark the call as a locally terminated call and the operation of block coupler 500–LB is as described for block coupler 500–LA on a call to a station on a harmonic-ringing line.

IIIB. *Code-ringing operation*

When the called station is on a code-ringing line, the initial digit prefixing the directory number of such desired line and station is assumed to be the initial digit 5. In this embodiment the initial digit wire ID5 of the noted Bellamy et al. application does not extend to the initial digit relays but is changed to become the equivalent of the code-ring wire CR of Fig. 2.

Upon dialing such initial digit, ground from the break contacts 6 and make contacts 5 of initial digit register IDR appears on the code-ring wire CR and is extended through contacts 13 of chain relay 2312 to the battery-connected winding of code-ring relay 2360, in a manner similar to the way the ground from block translator 1800 appearing on the code-ring wire CR is extended thereto.

The operation of the combined code and harmonic ringing coupler 500–LB from this point forward is as described with reference to Fig. 2 of block coupler 500–LA, with the removal of ground from wire CR occurring when the register IDR restores.

I claim:

1. In a telephone switching system, party lines of a first ringing type each having stations thereon arranged to be signalled by a first type of party-line ringing current, party lines of a second ringing type each having stations thereon arranged to be signalled by a second type of party-line ringing current, each said party line being indexed by a separate line number, each station on any said line being indexed by a separate station number, couplers and trunks extending respectively thereto, means controlled from a calling line for seizing any trunk and associated coupler, means for transmitting number signals over the seized trunk which comprise line-number signals representing the number of any party line of either said ringing type, and further comprise station-number signals representing the station number of the called station on the called line, means for recording the line number and for recording the station number represented by said signals, automatic switching apparatus, means for controlling the switching apparatus from the recording means to extend a connection from the seized coupler to the called line indexed by the recorded line number, station-selecting means in the seized coupler and means for operating it from the recording means to select the called station on the called line indexed by the recorded station number, type-selecting means in the seized coupler operable to select either of said types of party-line ringing current, means for operating the type-selecting means from the recording means according to the recorded line number and irrespective of the recorded station number, and means in the seized coupler for applying ringing current to the called line of the type selected by the type-selecting means to signal the called station selected by the station-selecting means.

2. In a telephone switching system according to claim 1, the said signals including a signal group in addition to the signal serving to indicate the called line and station thereon, the means for operating the type-selecting means including means responsive to the signals in said additional signal group.

3. In a telephone switching system according to claim 1, wherein the two ringing types of lines have respective blocks of line numbers assigned thereto, the line numbers in each block being assigned to respective lines, signal-responsive means for indicating the line number of the called line and the number block which contains it, and means for placing the type-selecting means under the control of the said signal-responsive means.

4. In a telephone switching system according to claim 3, said signal-responsive means including a translator common to all of the said couplers, said translator being included in the said means for controlling the switching apparatus to extend the connection from a seized coupler to the called line.

5. In a switching system according to claim 1, two sets of ringing leads common to all said couplers and means for supplying respective types of ringing current over said sets, the type-selecting means including means for selecting either of said sets according to the ringing type to which the called line belongs, and said station-selecting means including means for connecting any said ringing lead of either selected set into circuit with the called line.

References Cited in the file of this patent

UNITED STATES PATENTS

| | | |
|---|---|---|
| 1,487,996 | Williams | Mar. 25, 1924 |
| 1,727,133 | Richardson | Sept. 3, 1929 |
| 2,340,555 | Peterson | Feb. 1, 1944 |
| 2,497,782 | Lomax | Feb. 14, 1950 |
| 2,542,272 | Bakker | Feb. 20, 1951 |
| 2,765,368 | Howitz et al. | Oct. 2, 1956 |